Feb. 26, 1929.
C. H. GAFFNER
1,703,579
SEPARABLE COUPLING FOR ROPES
Filed May 16, 1928
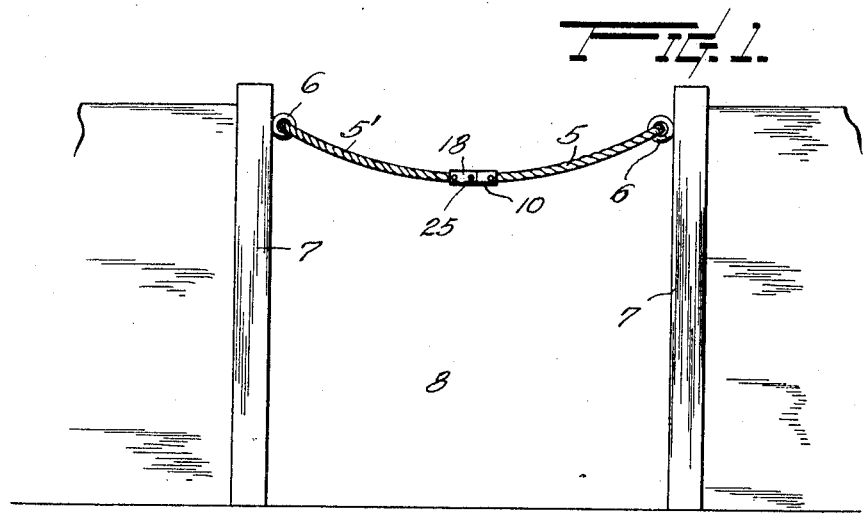
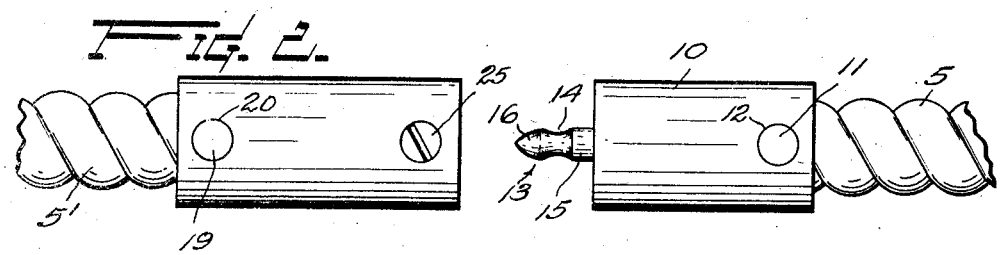
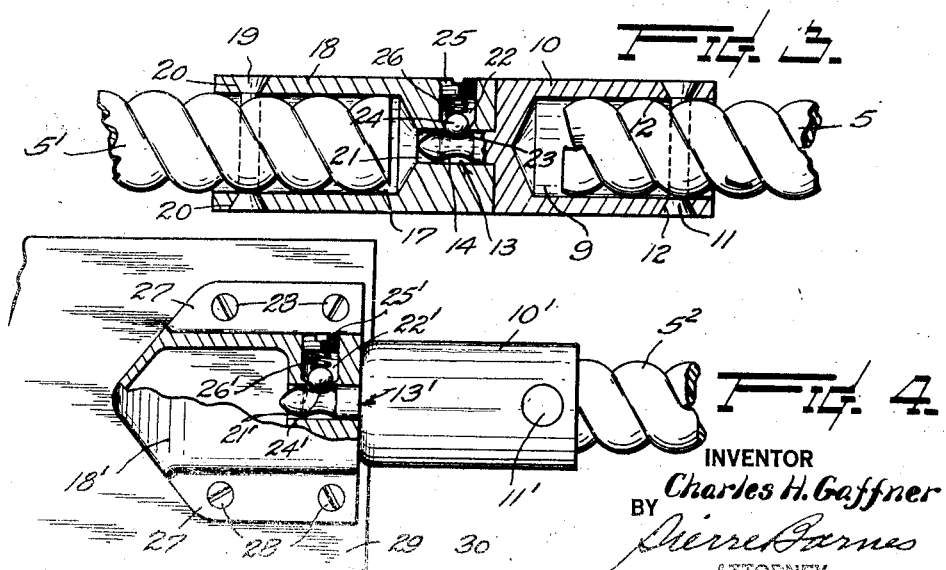
INVENTOR
Charles H. Gaffner
BY
Pierre Barnes
ATTORNEY Patented Feb. 26, 1929.

1,703,579

UNITED STATES PATENT OFFICE.

CHARLES H. GAFFNER, OF SEATTLE, WASHINGTON.

SEPARABLE COUPLING FOR ROPES.

Application filed May 16, 1928. Serial No. 278,144.

This invention relates to releasable barriers of rope, or an equivalent, for use in aisles of theaters and the like to eliminate personal injury or life hazard in case of panics.

The object of the invention is the provision of devices of this character which will be of simple construction, convenient to apply and efficient in use.

More specific objects and advantages of the invention will appear in the following description.

The invention consists in the novel construction, adaptation and combination of parts hereinafter described and claimed.

In the accompanying drawing,—

Figure 1 is a front elevational view of an aisle barrier embodying the present invention; Fig. 2 is a similar view to an enlarged scale of central portions of the barrier shown in Fig. 1, the coupling members being illustrated in separated relation; Fig. 3 is a view of the parts shown in Fig. 1, the rope ends in elevation and the coupling members in longitudinal section; and Fig. 4 is a rear elevation of a portion of an aisle barrier, with a modified form of coupling, having one member thereof shown partly in section.

Referring to Figs. 1, 2 and 3, the numerals 5 and $5^1$ represent ropes or other flexible members, one end of each being permanently fastened to an eye-bolt 6 which is secured to posts 7 provided at opposite sides of a passageway 8—as, for example, the aisle of a theater. The free end of the rope 5, as shown in Fig. 3, extends into a socket 9 provided axially within one end of a cylindrical block 10 and is secured thereto as by means of a bolt 11 extending diametrically through the rope and also the peripheral wall surrounding the socket of said block, the ends of the bolt being riveted as shown in conical apertures, as 12, provided in the block.

Protruding axially of the block 10 from its end opposite the connection thereof with the rope 5 is a stub 13 having intermediate its length a groove 14 extending circumferentially about the stud to provide a neck of less diameter than the portions 15 and 16 of the stud at opposite sides of the neck.

The stud portion 15 is of a cylindrical shape, and the portion, or head, 16 is of a conoidal shape as shown in Figs. 2 and 3. The free end of the other rope $5^1$—like that of the rope 5—extends into a socket 17 at one end of a cylindrical block 18 and to which the rope $5^1$ is secured by means of a bolt 19 having heads riveted in apertures 20 of the block.

In its other end from the socket 17, the block 18 is provided with a bore 21 to receive the stud 13 with a slidable fit.

There is also provided at right angles to the bore 21 a second bore 22 which communicates therewith through an opening 23 of less diameter than that of the bore 22.

Provided within the bore 22 is a ball 24 of greater diameter than the opening 23 to permit the ball to extend into the bore 22 and serve as a catch with respect to the groove 14 of the stud when the two blocks 10 and 18, hereinafter termed coupling members, are in their mutually engaged relation as shown in Figs. 1 and 3. The outer end of the bore 22 is screw threaded to receive a screw threaded plug 25 between which and the catch 24 is provided a spring 26 to yieldably retain the catch in engaged or engageable position with respect to the stud groove 14.

Instead of locating the coupling intermediate the parts as 5 and $5^1$, of a divided rope, it is oftentimes desirable to use a single piece of rope and arrange the coupling at one end thereof.

Such an arrangement is illustrated in Fig. 4, wherein the rope, designated by $5^2$, is connected as by means of a bolt $11^1$ to a cylindrical coupling member $10^1$ provided with a stud $13^1$ similar to the stud pertaining to the member 10 above described. In the Fig. 4 disclosure, moreover, in lieu of the cylindrical member 18, I provide a member $18^1$ with apertured flange elements 27 whereby the member $18^1$ is rigidly secured as by means of screws 28 to a post, wall or seat-back—as denoted by 29 at one side of an aisle 30, the rope end opposite the end to which the coupling member $10^1$ is secured may be secured to a support as by means, not illustrated—such, for instance, as an eye bolt 6 shown in Fig. 1. The member $18^1$ is provided with a bore $21^1$ for the stud of the companion member, and also with a second bore $22^1$ for the catch, plug, and spring, $24^1$, $25^1$ and 26, respectively, as explained with reference to corresponding elements of the member 18.

The operation of the invention is very simple, consisting of mating the two companion coupling members by inserting the stud of one member into the bore 21 of the other member, the spring-pressed ball-catch of the latter engaging in the groove of the stud.

Thus connected the barrier is held across the aisle to close the same against the passing of people therethrough. To permit the passing of people, the coupling members are manually pulled asunder by a person, or may be forcibly thrust apart by a person or persons surging against the ropes to flex the same in case of a panic.

The invention with respect to its construction and mode of operation will, it is thought, be understood from the foregoing description.

What I claim, is,—

1. A separable coupling for a rope aisle-barrier, comprising two coupling members secured to the rope, one of said members being provided with a stud having a peripheral recess, the other of said members being provided with a bore to receive the stud and a second bore at right angles to the axis of the first named bore and communicating therewith, a ball provided in said second named bore, and a spring provided in the latter and adapted to actuate the ball to serve as a catch engageable in the recess of said stud for yieldably connecting the two coupling members together.

2. A separable coupling for a flexible aisle-barrier, comprising a coupling member provided axially therein with a bore, and a second coupling member provided with a protruding circular stud element adapted to engage with a sliding fit within the bore of the first named member, said stud being provided with a recess extending circumferentially about its periphery, and a spring-pressed catch provided in said first named member and extending into engageable relation with respect to the recess of said stud for releasably securing said members against longitudinal separation and permitting relative movement of the members with respect to each other.

Signed at Seattle, Washington, this 30th day of April, 1928.

CHARLES H. GAFFNER.